C. L. FORTIER.
AUTOMATIC CONTROL DEVICE.
APPLICATION FILED AUG. 4, 1915.
1,212,042. Patented Jan. 9, 1917.
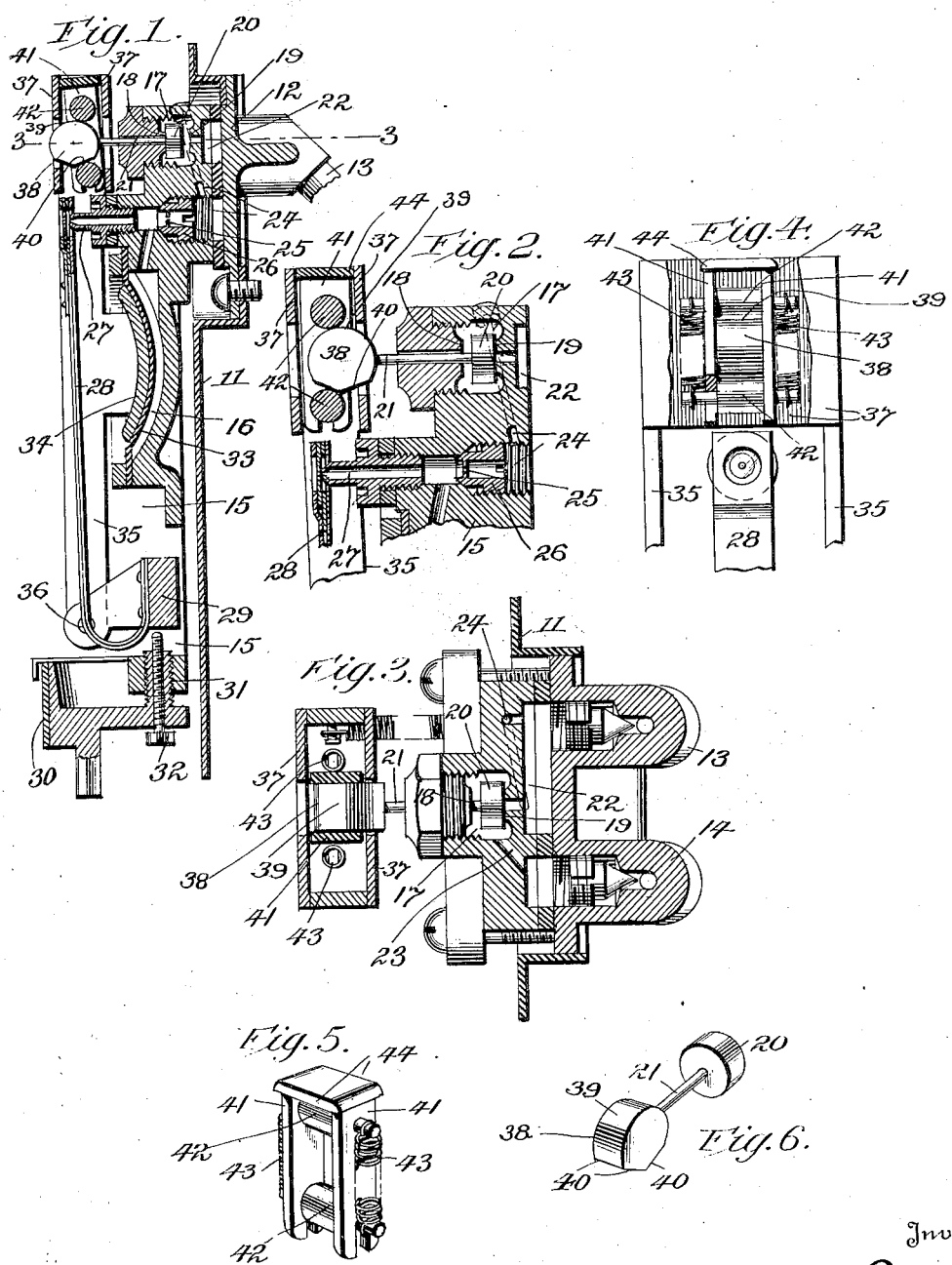
Inventor
Charles L. Fortier
By Dodge and Sons
Attorneys
Witness:
C. H. Raeder

UNITED STATES PATENT OFFICE.

CHARLES L. FORTIER, OF MILWAUKEE, WISCONSIN, ASSIGNOR TO JOHNSON SERVICE COMPANY, OF MILWAUKEE, WISCONSIN, A CORPORATION OF WISCONSIN.

AUTOMATIC CONTROL DEVICE.

1,212,042. Specification of Letters Patent. Patented Jan. 9, 1917.

Application filed August 4, 1915. Serial No. 43,661.

*To all whom it may concern:*

Be it known that I, CHARLES L. FORTIER, a citizen of the United States, residing at Milwaukee, in the county of Milwaukee and State of Wisconsin, have invented certain new and useful Improvements in Automatic Control Devices, of which the following is a specification.

This invention relates to thermostats, hygrostats and the like of the pressure motor type, and resides particularly in improvements in the quick-throw mechanism forming the subject matter of Patent No. 1,109,913, granted to me September 8, 1914.

The invention is illustrated as applied to a thermostat of the type more fully illustrated in the patent to Carl F. Johnson, No. 1,109,993, granted September 8, 1914, in the accompanying drawing, in which:—

Figure 1 is a vertical axial section of a complete thermostat in admission position; Fig. 2 is a fragmentary view similar to Fig. 1, but showing the device in exhaust position; Fig. 3 is a section on the line 3—3 of Fig. 1; Fig. 4 is a fragmentary front elevation of the motor-arm, broken away to show the quick-throw mechanism. Fig. 5 is a perspective view of the quick-throw yoke and rollers; and Fig. 6 is a perspective view of the valve and its attached quick-throw head.

The general scheme of operation is as follows: A responsive element, for example a thermostatic bar, controls the venting of pressure from a diaphragm chamber. Pressure fluid is supplied to this chamber at a rate less than the capacity of the vent, so that the alternate opening and closing of the vent causes alternate collapse and distention of the diaphragm. The diaphragm actuates a motor arm which operates a pilot valve through a quick-throw mechanism and the pilot valve when so actuated controls the admission and release of pressure to and from some controlled motor, such as a damper motor or the like.

The device is carried on a wall plate 11 to which is connected the pipe head 12. This has a supply-pipe connection 13 and a pipe connection 14 for connecting with the controlled motor such as the damper motor above mentioned.

The frame 15 of the thermostat is formed with a diaphragm chamber 16 and a pilot-valve chamber 17 which has opposed seats 18 and 19. The pilot valve 20 is arranged to shift alternately between these two seats. When it is against seat 18 it cuts off the exhaust around stem 21. When it is against seat 19 it cuts off the pressure supply entering through port 22 from connection 13.

The valve chamber 17 is connected by a port 23 to connection 14. A port 24 leads from connection 13 through a restricted aperture 25 to the diaphragm chamber 16. This aperture is very minute and is formed in a thin wall in a thimble 26 screwed into port 24. The thinness of the wall reduces the tendency for dust to accumulate at this point and the round aperture increases the freedom from clogging because a wider clear passage is afforded dust particles than is had in the annular opening of a needle valve adjusted for the same capacity.

A vent tube 27 leads from the diaphragm chamber 16 and has a capacity greater than that of aperture 25. The thermostatic bar 28 which controls this vent tube is carried on a weighted saddle 29 whose position is adjusted by turning an arc shaped dial 30. The dial 30 is fast on a stem 31 threaded into frame 15 so that the turning of the dial causes a slight axial movement of the stem. A screw 32 is threaded up through stem 31 and bears against the saddle 29. The dial is adjusted to read correctly by turning screw 32 and thereafter all adjustments of the thermostat to set it for desired maintained temperatures are made by swinging dial 30.

The diaphragm chamber 16 is covered with a flexible diaphragm 33 and this acts against a plate 34 carried by motor arm 35. The motor arm 35 is pivoted at 36 to the frame 15 and is drawn inward by a light spring. It is formed at its upper end with two spaced apertured plates 37 through which works a head 38 fast on valve stem 21. The head 38 is cylindrical on its upper face 39 but the lower face consists of two slightly inclined plane surfaces 40. A slotted yoke 41 is loosely mounted between the plates 36 and carries two rollers 42 which are guided in the slots in the yoke 41 and are drawn toward each other by coil springs 43. The yoke 41 is formed with ribs or bosses 44 across its upper end which fill the space between the plates 37 but the lower end of the yoke is narrower and hence is free to swing slightly. As the motor arm 35 moves initially the rollers 42 ride up on the inclined faces of the head 38. When the lower roller reaches the line of intersection of the faces it will snap over quickly thus rocking the yoke 41. This shifts the upper roller slightly. In this way I increase the certainty of action and secure quicker action, because the inclined faces 40 offer an immediate impelling tendency greater than can be had where the opposed faces are both round.

In the claims I shall use the term "controlling element" to include the pilot valve 20 or any of the substantially equivalent devices commonly used for the same general purpose in this art.

Having thus described my invention, what I claim is:—

1. In a control device of the pressure motor type, the combination with the pressure motor and the controlling element actuated thereby, of a quick throw device forming the operative connection between the motor and the controlling element and comprising a member movable by said motor; a pair of rollers carried by said member and movable therein toward and from each other in a direction transverse to the movement of said member; resilient means urging said rollers together; and a head having an enlarged middle portion, connected with said controlling element and embraced by said rollers.

2. In a control device of the pressure motor type, the combination with the pressure motor and the controlling element actuated thereby, of a quick throw device forming the operative connection between the motor and the controlling element and comprising a member movable by said motor; a pair of rollers carried by said member and movable therein toward and from each other in a direction transverse to the movement of said member; resilient means urging said rollers together; and a head connected with said controlling element, said head being embraced by said rollers and having one side formed with a convex curvature and the other with two intersecting substantially plane surfaces.

3. In a control device of the pressure motor type, the combination with the pressure motor and the controlling element actuated thereby of a quick throw device forming the operative connection between the motor and the controlling element and comprising a member movable by said motor; a yoke mounted in said member to have a slight swinging movement in the direction of movement of said member; a pair of rollers mounted in said yoke and movable toward and from each other; resilient means for urging said rollers toward each other; and a head connected with said controlling element, embraced by said rollers and having an enlarged middle portion.

4. In a control device of the pressure motor type, the combination with the pressure motor and the controlling element actuated thereby of a quick throw device forming the operative connection between the motor and the controlling element and comprising a member movable by said motor; a yoke mounted in said member to have a slight swinging movement in the direction of movement of said member; a pair of rollers mounted in said yoke and movable toward and from each other; resilient means for urging said rollers toward each other; and a head connected with said controlling element, embraced by said rollers, and having a convex curvature on the side toward the fulcrum of said yoke and an angular ridge on the opposite side.

5. In a control device of the pressure motor type, the combination with the pressure motor and the controlling element actuated thereby of a quick throw device forming the operative connection between the motor and the controlling element and comprising a member movable by said motor and having a pair of spaced retaining members; a yoke held between said members, confined at one end but free to swing slightly at the opposite end in the general direction of movement of said member; a pair of rollers mounted in said yoke and movable therein toward and from each other; resilient means for urging said rollers toward each other; and a head connected with said controlling element, embraced by said rollers and having an enlarged middle portion.

6. In a control device of the pressure motor type, the combination with the pressure motor and the controlling element actuated thereby of a quick-throw device forming the operative connection between the motor and the controlling element and comprising a member movable by said motor and having a pair of spaced retaining members; a yoke held between said members, confined at one end but free to swing slightly at the opposite end in the general direction of movement of said member; a pair of rollers mounted in said yoke and movable therein toward and from each other; resilient means for urging said rollers toward each other; and a head connected with said controlling element, embraced by said rollers, and having a convex curvature on the side toward the confined end of said yoke, and an angular ridge on the other side.

In testimony whereof I have signed my name to this specification.

CHARLES L. FORTIER.